United States Patent [19]

Kraft

[11] 4,231,452
[45] Nov. 4, 1980

[54] SPRING APPLIED, ELECTRIC RELEASED DRUM BRAKE

[75] Inventor: Joseph K. Kraft, Parsippany, N.J.

[73] Assignee: Westinghouse Electric Corp., Pittsburgh, Pa.

[21] Appl. No.: 973,989

[22] Filed: Dec. 28, 1978

[51] Int. Cl.³ ............................................. B60T 13/04
[52] U.S. Cl. .................................. 188/171; 188/334; 188/342; 198/854; 267/168
[58] Field of Search ............... 188/171, 173, 170, 334, 188/342; 267/168; 310/76, 77; 198/854

[56] References Cited

U.S. PATENT DOCUMENTS

| | | | |
|---|---|---|---|
| 1,024,489 | 4/1912 | Aalborg | 188/171 |
| 1,166,679 | 1/1916 | Handy | |
| 1,329,561 | 2/1920 | Thompson | 267/168 X |
| 1,551,401 | 8/1925 | Jones | 188/171 X |
| 1,748,773 | 2/1930 | Johnston | 188/171 |
| 1,795,508 | 3/1931 | Robertson | 188/171 |
| 1,834,894 | 12/1931 | Blankenship et al. | 188/171 X |
| 2,019,524 | 11/1935 | DeKay | 188/334 |
| 2,287,023 | 6/1942 | Carnes | 188/334 X |
| 2,460,017 | 1/1949 | Lautrup | |
| 2,631,266 | 3/1953 | Britt | 188/171 X |
| 3,862,751 | 1/1975 | Schwaller | 267/168 X |
| 3,866,725 | 2/1975 | Greutter | |
| 3,896,925 | 7/1975 | Mitsui et al. | |
| 3,927,738 | 12/1975 | Ernst | |

FOREIGN PATENT DOCUMENTS

| | | |
|---|---|---|
| 2003951 | 8/1971 | Fed. Rep. of Germany |
| 2123851 | 12/1971 | Fed. Rep. of Germany |
| 438626 | 6/1967 | Switzerland |

Primary Examiner—George E. A. Halvosa
Attorney, Agent, or Firm—D. R. Lackey

[57] ABSTRACT

A spring-applied, electrically released drum brake which is self-energizing in one direction, and partially deenergizing in the other direction. Regardless of braking direction, the brake shoes are applied with substantially zero force, with the braking force being increased to decelerate and stop the drum within predetermined jerk and deceleration constraints.

8 Claims, 10 Drawing Figures

SPRING APPLIED, ELECTRIC RELEASED DRUM BRAKE

BACKGROUND OF THE INVENTION

1. Field of the Invention

The invention relates in general to drum brakes, and more specifically to spring-applied, electrically released drum brakes.

2. Description of the Prior Art

Escalators are provided with an electrically released, mechanically applied brake capable of stopping an up or down traveling escalator with any load up to brake design load.

The maximum braking effort is required to stop a fully loaded escalator going down, and thus the brake is sized accordingly. For example, the brake torque is selected to provide some minimum value of deceleration, such as about 1 ft/sec$^2$, when an escalator with rated load is stopped while transporting passengers from an upper landing to a lower landing. Thus, any other condition than a fully loaded escalator going down will result in a higher rate of deceleration. The highest rate of deceleration would occur when a fully loaded escalator is braked to a stop while transporting passengers from the lower landing to the upper landing. This may be about 8 to 10 ft/sec$^2$ for a typical escalator with a fixed braking torque.

The prior art has disclosed many different arrangements which adjust the braking effort, in order to decrease the range between the minimum and maximum rates of deceleration which may occur, by taking such things as speed, load, and/or travel direction into account. For example, the braking effort may be adjusted according to load, according to speed, such as in response to an error signal which is responsive to the difference between the actual speed and the desired speed of the escalator while braking to a stop, or in response to travel direction. In general, such controlled braking arrangements add substantially to the cost of an escalator, as well as to the maintenance thereof, because of the more complex mechanical and/or electrical apparatus required.

It would be desirable to provide a new and improved brake suitable for an escalator which will inherently provide substantially less braking force in one direction than the other, enabling such a brake to be used to inherently brake with a greater force when the escalator is moving such that it would transport passengers from an upper to a lower landing.

It would further be desirable to provide a new and improved brake with the above-mentioned inherent directional braking effort capabilities, which will apply the braking force within predetermined jerk and deceleration constraints, with a deceleration rate which is substantially constant, regardless of load, for a down traveling escalator.

SUMMARY OF THE INVENTION

Briefly, the present invention is a new and improved fail-safe brake which inherently applies a greater braking effort in one direction of rotation than in the other direction, and which applies a braking torque to the object to be braked which starts at substantially zero braking force and increases at a controlled rate. Thus, this new and improved brake is ideally suited for an escalator.

More specifically, the new and improved brake is a spring-applied, electrically released drum brake having brake shoes mounted such that they are of the leading type in one direction of drum rotation, wherein shoe actuation in this direction of drum rotation assists the actuating force. This assist is called "self-energization." In the other direction of rotation, the shoes are of the trailing type, wherein shoe actuation opposes the actuating force.

Further, instead of applying a fixed braking torque upon brake actuation, the brake is arranged to cause the brake shoes to contact the brake drum with very little initial braking force, and to build the braking force to provide a predetermined deceleration rate which increases to a predetermined maximum deceleration rate with a controlled slope which maintains jerk below a very low magnitude, such as 6 ft/sec$^3$.

BRIEF DESCRIPTION OF THE DRAWINGS

The invention may be better understood and further advantages and uses thereof more readily apparent, when considered in view of the following detailed description of exemplary embodiments, taken with the accompanying drawings in which:

FIG. 8 is a partially schematic and partially block diagram of a feedback arrangement for controlling the position of a solenoid, and thus the braking force, for the brake shown in FIG. 3;

DESCRIPTION OF PREFERRED EMBODIMENTS

Figure 1:
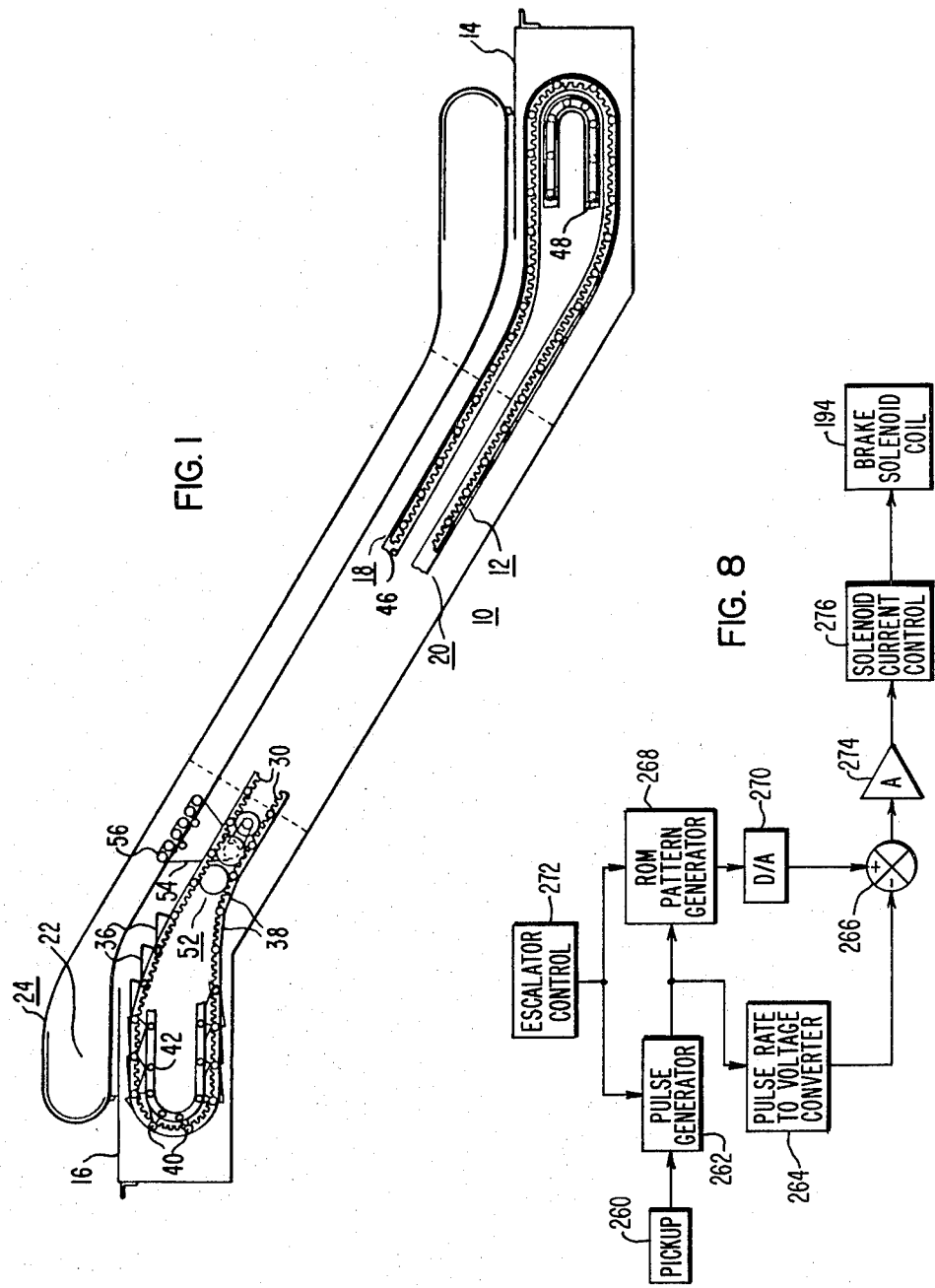
FIG. 1 is an elevational view of an escalator which may be constructed according to the teachings of the invention.

Referring now to the drawings, and to FIG. 1 in particular, there is shown an escalator of the type which may utilize the teachings of the invention. Escalator 10 employs a conveyor 12 for transporting passengers between a first or lower landing 14 and a second or upper landing 16. The conveyor 12 is of the endless type, having an upper load bearing run 18 on which passengers stand while being transported between the landings, and a lower return run 20.

A balustrade 22 is disposed above the conveyor 12 for guiding a continuous, flexible handrail 24.

Conveyor 12 includes a plurality of steps 36, only a few of which are shown in FIG. 1. The steps are each clamped to a step axle, and they move in a closed path, with the conveyor 12 being driven by the modular drive arrangement disclosed in U.S. Pat. No. 3,677,388, which is assigned to the same assignee as the present application.

As disclosed in U.S. Pat. No. 3,677,388, the conveyor 12 includes an endless belt 30 having first and second sides, with each side being formed of toothed links 38, interconnected by the step axles to which the steps 36 are connected. The steps 36 are supported by main and trailer rollers 40 and 42, respectively, at opposite sides of the endless belt 30. The main and trailer rollers 40 and 42 cooperate with support and guide tracks 46 and 48, respectively, to guide the steps 3 in the endless path or loop.

The steps 36 are driven by a modular drive unit 52 which includes sprocket wheels, and a drive chain for engaging the tooth links 38. The modular drive unit 52 includes a handrail drive pulley 54 on each side of the conveyor which drives a handrail unit 56.

Figure 2:
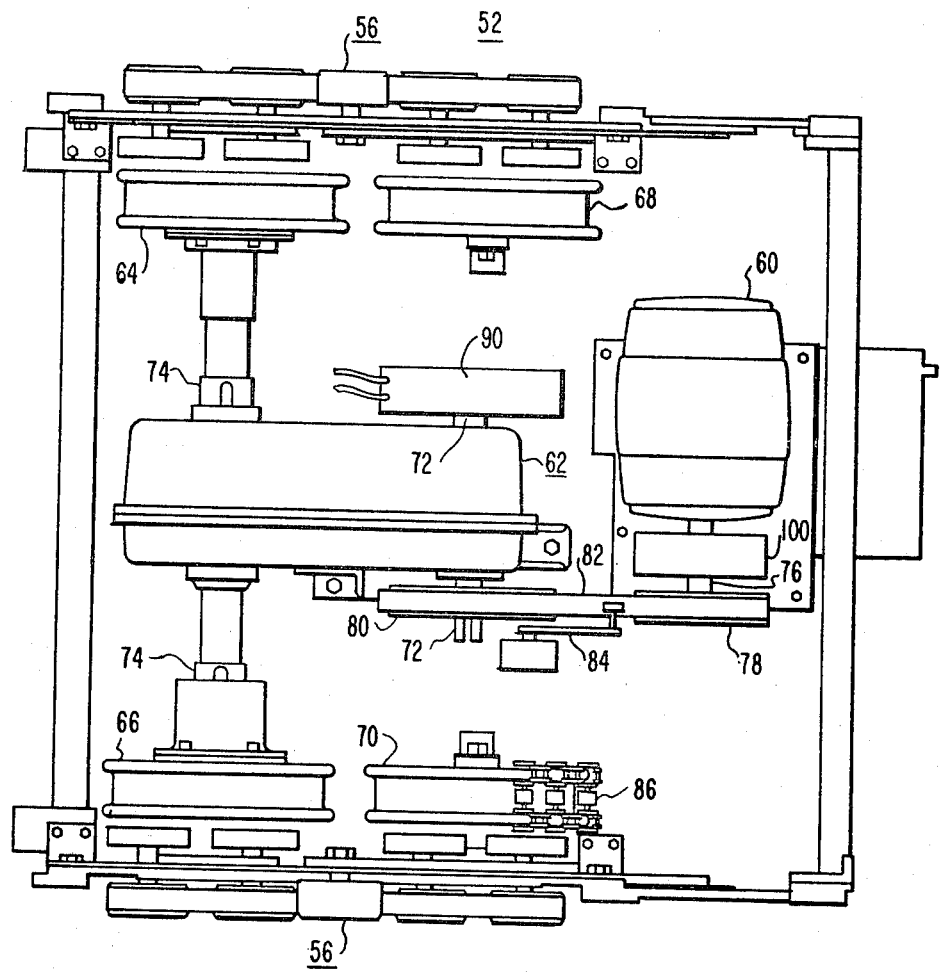
FIG. 2 is a plan view of a drive unit for an escalator which may utilize a brake constructed according to the teachings of the invention.

FIG. 2 is a plan view of drive unit 52 shown in FIG. 1. In general, drive unit 52 includes a drive motor 60, such as a three-phase 60 Hz. induction motor, a gear reducer 62, drive sprocket wheels 64 and 66, and idler sprocket wheels 68 and 70. The gear reducer 62, which may be a commercial 36.2:1 gear reducer, has an input shaft 72 and an output shaft 74. The drive motor 60 has a motor shaft 76. The motor shaft 76 is coupled to the input shaft 72 of the gear reducer 62 by any suitable means, such as via pulleys 78 and 80, and a timing belt 82. A broken belt switch 84 monitors the integrity of belt 82.

The output shaft 74 of gear reducer 62 is connected to the drive sprockets 64 and 66, and each driven sprocket is coupled with an idler sprocket via a drive chain 86. As illustrated, the drive chain may have three strands, with the outer two strands engaging teeth on the sprocket, and with the inner strand engaging the teeth on the toothed links 38, to drive the endless belt 30 about its guided loop. A fail-safe friction brake 90, which is electrically released and mechanically applied, is mounted on input shaft 72 of the gear reducer 62. Brake 90 is constructed according to the teachings of the invention.

Figure 3:
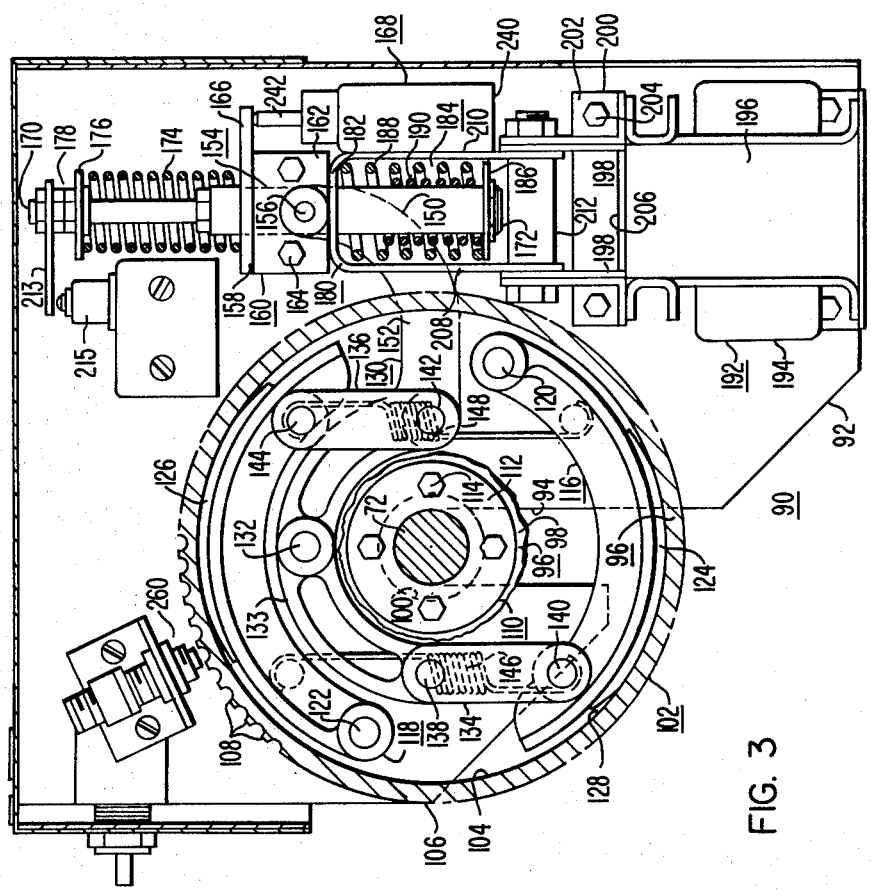
FIG. 3 is an elevational view of a brake constructed according to the teachings of the invention, with the brake being illustrated in the brake-applied condition.

FIG. 3 is an elevational view of brake 90, with certain parts cut away in order to more clearly illustrate the operational details of the brake. Brake 90 includes a mounting plate 92 having a slot 94 for receiving the input shaft 72 of the speed reducer 62 shown in FIG. 2. Brake 90 includes a rotatable first brake element or brake drum 96, which includes a circular flat wall portion 98 which extends from a central opening 100 to an outer cylindrical flange 102. The majority of the wall portion 98 is illustrated being cut away in FIG. 2, in order to reveal the brake operating mechanism which is normally concealed within the drum 96. Flange 102 includes an inner surface 104, which forms one of the friction surfaces of the brake 90, and an outer surface 106. As illustrated, uniformly spaced teeth 108 may be formed about the outer circumference of the flange 102, such as adjacent to the perimetrical edge of the flange. The purpose of such teeth will be hereinafter explained.

Brake drum 96 is mounted on reducer shaft 72 via a bushing 110. Opening 100 in drum 96 may be formed by a mounting hub having a tapered opening, and bushing 110 may have a cylindrical portion having an I.D. sized to fit the O.D. of shaft 72, and an O.D. tapered to complement the tapered opening in the drum. A flange 112 on bushing 110 has openings for receiving mounting bolts 114, which threadably engage tapped openings in the drum.

A second braking element comprising brake shoes are disclosed to co-act with the drum 96, such as first and second brake shoes 116 and 118. Brake shoe 116 has one end pivotally fixed to plate 92 via pivot pin 120, and brake shoe 118 has one end pivotally fixed to mounting plate 92 via pivot pin 122. Brake pads 124 and 126 on brake shoes 116 and 118, respectively, contact surface 104 of brake drum 96 when brake 90 is applied. Brake pads 124 and 126 are designed to have a slightly smaller radius than the radius of inner surface 104. This arrangement controls initial and subsequent contact with the drum, wherein the pads 124 and 126 are caused to contact surface 104 of drum 96 with their intermediate portions, leaving small clearances between the pads and the drum at both ends of the pad, such as clearance 128 between one end of pad 124 and surface 104. This arrangement aids the seating-in of the brake pads, and provides better control over a self-energizing feature of the brake in one rotational direction of the drum 96, as will be hereinafter explained.

A brake actuating lever 130 is pivotally fixed to mounting plte 92 via a pivot pin 132. Lever 130 includes a curved portion 133, which defines a half-circle, the midpoint of which is pivoted on pin 132. The ends of the curved portion 133 are connected to operate the brake shoes 116 and 118 via links 134 and 136, respectively. The ends of link 134 are pivotally fixed to lever 130 and shoe 116 via pivot pins 138 and 140, respectively, with pin 140 being located at the opposite end of shoe 116 from its fixed pivot pin 120. The ends of link 136 are pivotally fixed to lever 130 and shoe 118 via pivot pins 142 and 144, respectively, with pin 144 being located at the opposite end of shoe 118 from its fixed pivot pin 122. Springs 146 and 148 are biasing springs, which interconnect the shoes 116 and 118 to provide instant response upon release of the brake. This is important to the invention wherein the setting of the brake is desired during the very initial portion of travel of the electrical brake setting means, while permitting the remaining portion of the travel to be used for accomplishing other functions, to be hereinafter explained.

Brake actuating lever 130 additionally includes an arm portion 150 bent at 152 such that it extends from within drum 96 to the outside thereof. Its extreme outer end is pivotally mounted to a brake actuating rod 154 via a pivot pin 156. Rod 154 slidably extends through an opening in a leg portion 158 of an L-shaped spring mounting bracket 160. The other leg portion 162 is fastened to mounting plate 92 via fasteners 164. Leg portion 158 includes an extension 166 for coacting with a pneumatic or hydraulic regulator, such as a dashpot 168, as will be hereinafter explained.

Thus, brake actuating rod 154 is supported on one end of brake actuating lever 130, and it is guided for rectilinear movement via spring mounting bracket 160. Rod 154 includes first and second ends 170 and 172, respectively. End 170 is threaded, and a main or primary spiral spring 174 is telescoped over end 170, with one end of the spring 174 being disposed in a circular depression formed in the spring mounting bracket 160 about the opening therein which receives the rod 154. A spring collar 176 is disposed about rod 154, over end 170, against the other end of spring 174. Nuts 178 are threadably engaged with end 170, and they are advanced to compress spring 174 to a predetermined stored force. The preset compression of spring 174 determines the maximum braking force to be applied by the shoes 116 and 118 against the brake drum, and it is selected according to the width and rise of the associated escalator. It will be noted that compression spring 174 forces rod 154 vertically upward, in the view of FIG. 3, which rotates lever 130 counterclockwise about pivot pin 132, forcing link 136 vertically upward and link 134 vertically downward, to pivot shoes 116 and 118 about their fixed pivot points to force the brake pads against surface 104 of the brake drum 96. Spring 174 may be compressed to a predetermined height for a specific width and rise of the associated escalator, and the resulting braking force may be checked by applying a torque wrench to the input shaft 72 of the gear reducer 62.

Axial displacement of the brake actuating rod 154 in the downward direction, with a force sufficient to overcome the preset bias of spring 174, will pivot lever 130 clockwise about pivot pin 132, and links 134 and 136, aided by biasing springs 146 and 148, will draw the shoes 116 and 118 away from drum 96, to release the brake.

According to the teachings of the invention, a U-shaped member or yoke 180 having an opening in the bight 182 sized to slide over end 172 of rod 154, is telescoped over end 172. A secondary spring arrangement 184 is disposed over end 172, and a spring collar 186 is fixed to end 172. The secondary spring arrangement 184, in this embodiment, includes a first spiral spring 188 which extends across the complete dimension between bight 182 and spring collar 186, and a second spiral spring 190 disposed concentrically within the opening in the first spiral spring 188. The second spiral spring 190 has a shorter length dimension than the first spring 188. This two-spring arrangement provides a compound spring characteristic required to provide a stored force in the secondary spring arrangement 184 which will be capable of exceeding the stored force in the primary spring 174, while providing a compound spring characteristic curve which will follow the force curve of the electrical actuating means without exceeding the latter curve at any point. It is essential that the ultimate stored force in the secondary spring arrangement 184 exceeds the preset force in the primary state 174, in order to apply the brake shoes 116 and 118 to drum 96 with substantially zero initial force when the brake 90 is applied, as will be hereinafter explained. It is also essential that the stored force in the secondary spring arrangement 184 not exceed the force versus the position characteristic of the electrical actuating means, in order to prevent the electrical actuating means from stalling before completing its stroke.

Figure 4:
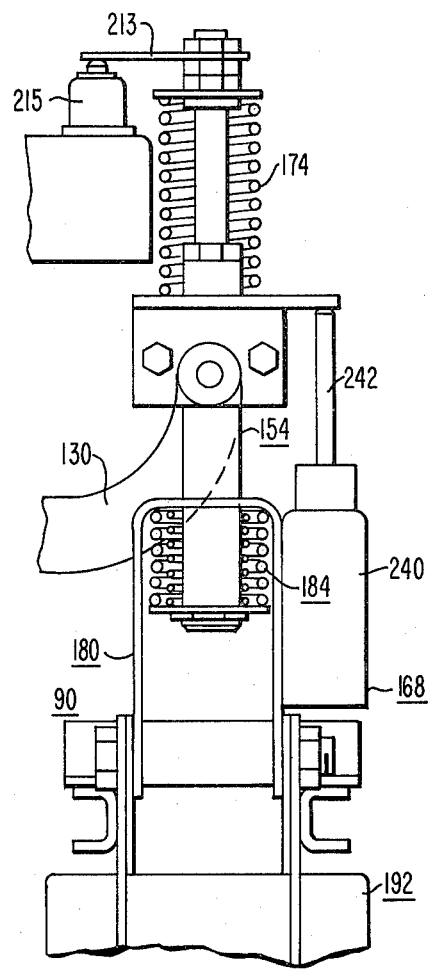
FIG. 4 is a fragmentary view of the brake shown in FIG. 3, illustrating the brake operating mechanism in the brake-released condition.

The electrical actuating means may be an electromagnetic solenoid 192, which includes an electrical coil 194, a magnetic core 195, and a movable armature having arms or extensions 198. Solenoid 192 is fixed to the mounting plate 92 via an L-shaped mounting bracket 200 having one leg 202 fixed to plate 92 via fasteners 204, and the other leg 206 fixed to the solenoid 192 via suitable fasteners (not shown). Arms 198 are linked to the leg portions 208 and 210 of yoke 180 via pin 212, which extends through aligned openings in arms 198 and legs 208 and 210. When solenoid 192 is deenergized, the brake 90 is in the brake-applied condition shown in FIG. 3. When solenoid 192 is energized its armature moves vertically downward through a predetermined stroke, which will be assumed to be 1", for purposes of example, to release the brake. FIG. 4 is a fragmentary view of brake 90, illustrating the condition of the solenoid 192 and its associated actuating mechanical assembly, in the brake-released condition. A finger 213 may be fixed to end 170 of the actuating rod 154, in order to actuate a switch 215 which is fixed to the mounting plate 92. When the brake is released, the downward movement of rod 154 causes finger 213 to actuate switch 215. Actuation of switch 215 indicates to the escalator control that the brake has released and that drive power may be applied to the escalator drive mechanism.

As hereinbefore explained, the primary spring 174 is preloaded to a predetermined stored force when the brake is set, with this value being determined by the width and rise of the escalator. For example, for a 48" wide stairway, the preload is 35# for a 12' rise, 55# for an 18' rise, and 75# for a 25' rise. The long secondary spring 188 has from 0 to 5 pounds preload force when the brake is set, and the short secondary spring 190 is unloaded. When the solenoid 192 is energized to release the brake, the solenoid starts its stroke by compressing first the long secondary spring 188, and then both the long and short secondary springs. Rod 154 does not move during this time, remaining stationary until the force stored in the secondary springs exceeds the preload force stored in the primary spring 174. When the force stored in the secondary springs exceeds the preload of the primary spring, the primary and secondary springs will all be compressed simultaneously and rod 154 will now be displaced downwardly, to release the brake.

Figure 5:
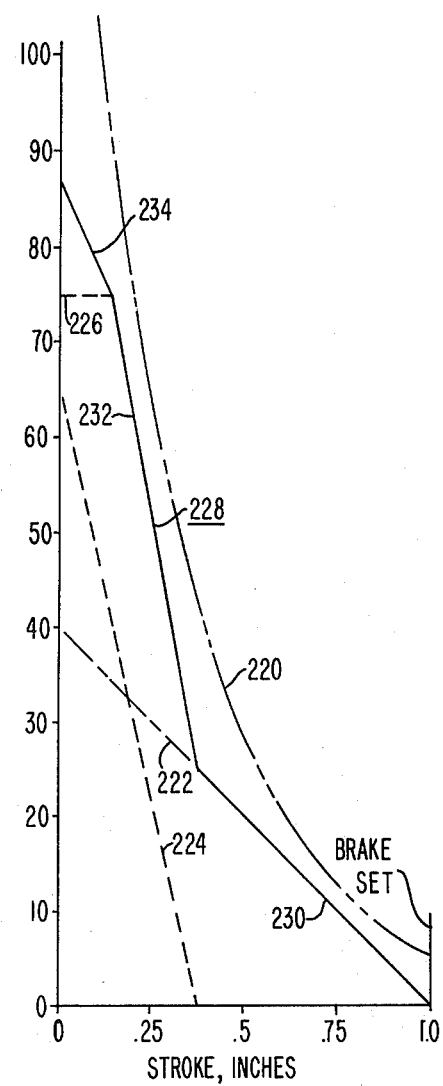
FIG. 5 is a graph which illustrates the force characteristics of the mechanical operating mechanism and the operating solenoid, for the brake shown in FIGS. 3 and 4.

FIG. 5 graphically illustrates the release of the brake 90 for a solenoid 192 having a 1" stroke. Curve 220 plots the force available from a selected solenoid, versus stroke position. The specific solenoid used had a pull-in voltage of 125 volts D.C. at 2.5 amperes. The holding voltage was 24 volts D.C. at 0.5 amperes. Curve 222 illustrates the force characteristic curve of the long secondary spring 188. Curve 224 illustrates the force characteristic curve of the short secondary spring 190. Curve 226 illustrates the preload on the primary spring 174. Curve 228 is the resulting composite force versus stroke curve for the spring arrangement shown in FIGS. 3 and 4.

When the brake is set, the force stored in the secondary springs is substantially zero, and the primary spring is at the preload force. When the brake is to be released, the solenoid starts its stroke by compressing the long secondary springs, it then compresses the long and short secondary springs, and when the force stored in the secondary springs equals the preload of the primary spring, it compresses the primary and secondary springs. Thus, when the brake is in the released condition, the force stored in the primary spring is slightly greater than its preload force, and the force stored in the secondary springs is slightly greater than the force stored in the primary spring. The difference between the stored force of the primary spring, and the stored force of the secondary springs, is slight.

When solenoid 192 is deenergized, the armature is not allowed to travel through its stroke solely under the influence of the primary and secondary springs. It is critical to the invention that the force applied by the brake shoes against the brake drum, during the setting of the brake, be equal to the arithmetic difference between the forces stored in the primary and secondary springs. Thus, the secondary spring arrangement 184 must react against yoke 180 to force rod 154 downwardly, while primary spring 174 is reacting against the fixed spring seat 158 to force rod 154 upwardly. Then, by controlling the position of yoke 180 to allow the secondary spring arrangement to decompress according to a predetermined schedule, the brake shoe force pattern and thus the jerk and deceleration of the escalator may be controlled to follow predetermined curves.

Figure 6:
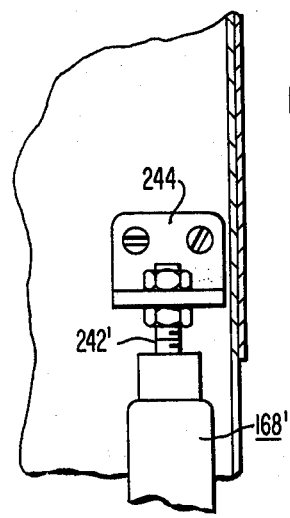
FIG. 6 is a fragmentary view of the brake shown in FIG. 3, illustrating an embodiment of the invention wherein energization of the operating solenoid is cushioned, as well as its release.

In the embodiment of the invention shown in FIGS. 3 and 4, the yoke 180 and thus the position of the solenoid armature versus time, is controlled by a viscous damping device such as dashpot 168. Dashpot 168 has one portion, such as the cylinder portion 240, fixed to yoke 180. Its other portion, such as the piston portion 242, contacts extension 166 which is part of the fixed spring seat bracket 160. Dashpot 168 may be a type which provides controlled movement in only one direction, such as illustrated in FIG. 3, wherein the piston is spring biased to the position shown in FIG. 4 when the brake is released. The dashpot 168 then controls the movement of yoke 180 from the FIG. 4 position to the FIG. 3 position. Or, as illustrated in FIG. 6, which is a fragmentary view of dashpot 168, referenced 168' in order to indicate the modification thereof, the piston 242' may have its outer end fixed to a fixed bracket 244 which is fastened to mounting plate 92. In the arrangement of FIG. 6, dashpot 168' will cushion the pick-up of the solenoid 192, in addition to controlling the setting of the brake 90.

Returning to the graph of FIG. 5, when the solenoid is deenergized, the secondary spring arrangement 184 works against the yoke 180, which in turn is controlled by dashpot 168. The first part of the travel of the solenoid armature and yoke 180, such as about 0.25 inch, allows both the primary spring 174 and the secondary spring arrangement 184 to start to decompress, and rod 154 is displaced upwardly to the point where the brake shoes 116 and 118 contact the brake drum 96. This initial contact is made with very little force, i.e., the difference between the stored forces in the primary and secondary spring arrangements. Further movement of the solenoid armature and yoke 180 allows decompression of the secondary spring arrangement 184, but the primary spring 174 will not decompress beyond its preset load, as the shoes are now in contact with the brake drum, and lever 130 and rod 154 thus have reached their travel limits. The force of the shoes against the drum, however, continues to increase in a controlled manner as the secondary spring arrangement continues to decompress as the dashpot allows the solenoid armature to continue its controlled stroke. The secondary spring force curve 228 follows a first segment 234 until the stored spring force drops below the preset primary spring force, and then it follows a segment 232 which is a composite curve formed by the characteristics 222 and 224 of the long and short secondary springs 188 and 190, respectively. When the short secondary spring is no longer compressed, the characteristic curve follows a segment 230 which is part of the long secondary spring characteristic curve 222. Curve segments 232 and 230 subtract from the preset value of curve 226 at each position of the solenoid armature to determine the brake shoe force at each armature position. Curve 228 is valid for any setting of the dashpot 168, as it is a force versus stroke curve, and not a force versus time curve.

Figure 7:
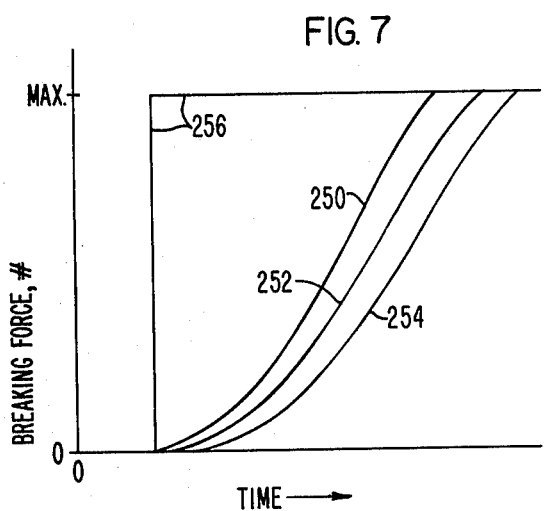
FIG. 7 is a graph which illustrates different settings of the dashpot used in the embodiment of the brake shown in FIG. 3.

FIG. 7 is a graph which plots braking force of the brake shoes against the brake drum versus time. Curves 250, 252 and 254 illustrate different dashpot settings. Curve 256 illustrates the type of braking curve which would occur without the use of the secondary spring arrangement 184. If the secondary spring arrangement 184 were to be eliminated, the braking force would immediately increase to its maximum value, and then the braking force would be constant. The present invention prevents this infinite jerk from occurring upon initial brake application, and it controls the deceleration rate to cause it to reach the maximum value in response to the arithmetic difference in the spring portions of the primary and secondary spring arrangements.

From curve 228, it will be noted that the position of the solenoid armature controls the braking torque. It will also be noted that the secondary spring characteristic curve 228 reaches and exceeds the preset primary spring portion 226 without exceeding the force available in the solenoid, i.e., curve 220, at any stroke position. This is important, as the solenoid must not be stalled by the spring arrangement. For lower preloads on the primary spring 174, it may be possible to utilize a single secondary spring.

Instead of controlling the position of the solenoid armature by the dashpot 168 during the setting of the brake, the current in the solenoid coil 194 may be controlled to control the solenoid position. The current may be controlled in an open-ended manner, to function as an electrical dashpot, or it may be controlled according to escalator speed, to cause the escalator to decelerate and stop according to a predetermined deceleration schedule, which would decelerate a down traveling escalator in precisely the same manner from full load to no load on the escalator. However, even when the solenoid current is being controlled, a dashpot of some sort may still be utilized, to provide damping. The dashpot in this instance would have a different characteristic than the dashpot 168.

In a feedback type of arrangement, a pickup 260 may be disposed on mounting base 92, adjacent to the teeth 108 formed on the outer surface 106 of drum 96. Pickup 260, which may be of the magnetic type, or any other suitable type, will provide pulses, with each pulse being an indication of a predetermined increment of escalator travel. The pulse rate will be an indication of the escalator speed. As shown in FIG. 8, the pickup 260 may be connected to a pulse generator 262, which shapes the pulses from the pickup 260. The pulses from pulse generator 262 are applied to a pulse rate-to-voltage converter 164. The output from converter 264 is an analog signal, which is applied to one input of a summing junction 266.

A desired deceleration speed pattern may be programmed into a read only memory (ROM) 268. The output of memory 268 is connected to a digital-to-analog converter 270, and converter 270 provides an analog speed pattern signal, which is applied to the remaining input of the summing junction 266.

When the escalator control 272 indicates the escalator should decelerate and stop, and elevator drive power to the drive motor is cut off, a signal is provided which enables the pulse generator to generate output pulses for the converter 264 and the memory or pattern generator 268. The pattern generator 268 starts at a value responsive to normal escalator speed, and each pulse clocks a counter which addresses the memory 268, with each succeeding address or count causing memory 268 to provide a new, lower output for the new position of the escalator. Thus, the memory 268 indicates the desired speed for each position increment which occurs following the decision to stop the escalator. Summing junction 266 provides a signal responsive to any difference between the actual and desired speeds. Error amplifier 274 amplifies the difference signal, and this error signal is applied to solenoid current controller 276. Solenoid current controller 276 controls the voltage applied to the brake solenoid coil 194, and thus the current flowing in the solenoid coil is controlled. A ROM speed feedback control system is disclosed in U.S. Pat. No. 4,102,436, which is assigned to the same assignee as the present application. Of course, other suitable speed feedback arrangements may be used.

Brake 90, as described to this point, will thus apply a braking force with very little jerk, and it will cause the braking force to smoothly build to the maximum value, maintaining the rate of change of deceleration or jerk below a predetermined low value, such as 6 ft/sec$^3$. Thus, a downwardly traveling escalator will be smoothly decelerated and stopped according to the same deceleration schedule, regardless of load.

Figure 9:
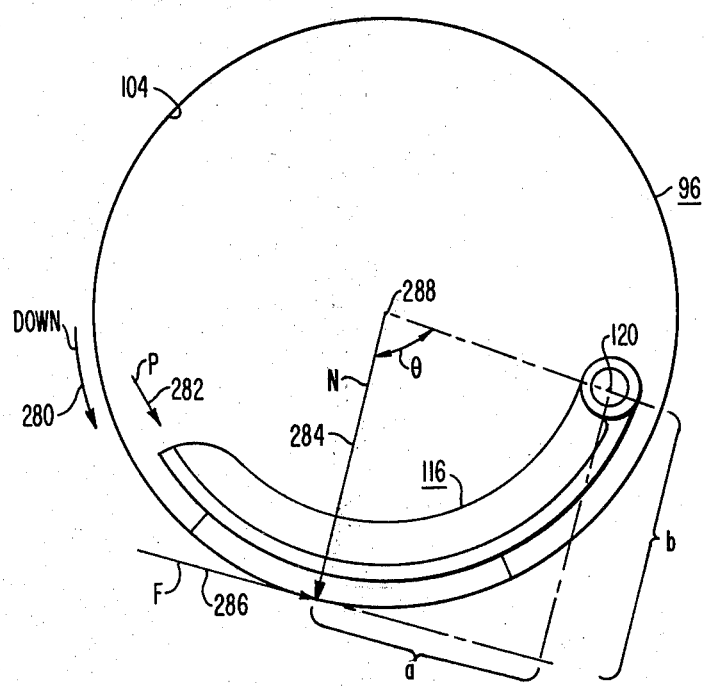
FIG. 9 is a diagrammatic view of the drum and one of the brake shoes of the brake shown in FIG. 3, illustrating the relationship between the location of the shoe pivot point, the center of the drum, and the diameter of the drum.

The inertia of the escalator and the passenger load will stop an up traveling escalator. If the brake 90 were to apply the same braking force to an upwardly traveling escalator as it does to a downwardly traveling escalator, the stop of an upwardly traveling escalator may be very abrupt, especially when loaded. The present invention solves this problem without requiring any feedback information as to which direction the escalator is traveling when the brake is applied, by inherently braking the escalator with different braking efforts in the two travel directions. To accomplish this, the brake shoes 116 and 118 are purposely arranged to be self-energizing when the escalator is traveling in the downward direction, i.e., to transport passengers from an upper to a lower landing, and partially deenergizing in the up-travel direction. In other words, when the drum 96 is rotating such that the escalator is traveling downwardly, the mounting arrangement of the brake shoes automatically makes them the leading shoe type wherein the direction of drum rotation helps apply the braking actuation forces. When the brake drum is rotating in the opposite direction, the shoes are automatically of the trailing type wherein the drum rotation reduces the braking actuation force. This is schematically illustrated in FIG. 9, with brake shoe 116 being illustrated mounted in brake drum 96. The explanation for brake shoe 118 would be similar to that of 116, and thus brake shoe 118 is not illustrated. Arrow 280 indicates drum rotation for a downwardly traveling escalator. When the brake 90 is set or applied, the actuating force P, illustrated by arrow 282, applies a normal force N to the brake shoe 116, indicated by arrow 284, which in turn provides the friction force F, indicated by arrow 286. The friction force F is equal to the coefficient of friction $\mu$ multiplied by the normal force N, i.e., (F=$\mu$N). The friction force F tends to rotate the brake shoe 116 counterclockwise about the center 288 of brake drum 96, which increases the normal force N, which increases the friction force F, which again increases the normal force N, etc. The increase in the normal force is proportional to the friction force F multiplied by the ratio of the distance b, i.e., the perpendicular distance of force F to the pivot pin 120 to the distance a, i.e., the perpendicular distance of the normal force N to the pivot pin 120. Thus, if N$_1$ is equal to the increase in the normal force:

$$N_1 = Fb/a \qquad (1)$$

If F$_1$ is the added friction force:

$$F_1 = UN_1 = UFb/a \qquad (2)$$

This self-energizing action is cumulative so that the total friction force F$_T$ is:

$$F_T = F[1 + Ub/a + (Ub/a)^2 + \ldots (Ub/a)^N] \qquad (3)$$

The factor within the brackets of equation (3) is called the energy factor. The quantity Ub/a must be less than unity in order to prevent the brake from being selflocking.

Angle $\theta$ in FIG. 9 is the included angle between the average normal force N and a line drawn through the shoe pivot axis and the drum center 288. With an angle $\theta$ of 68° and a coefficient of friction $\mu$ of 0.4, the brake torque will be relatively stable for changes in $\mu$ and in the angle $\theta$ as the brake shoes seat themselves into full contact with the brake drum. To further control initial and subsequent contact of the shoes with the brake drum, the brake shoes are designed with a smaller radius than the brake drum, as hereinbefore pointed out. This causes the brake shoes to contact at their midpoint leaving a small clearance to the drum at both ends of the shoes. This clearance can readily be checked during manufacture with a feeler gage through windows in the brake drum.

As the shoes progressively "seat-in" the angle $\theta$ will increase to 85° maximum and then finally move back to 68° when the shoes are fully seated.

Figure 10:
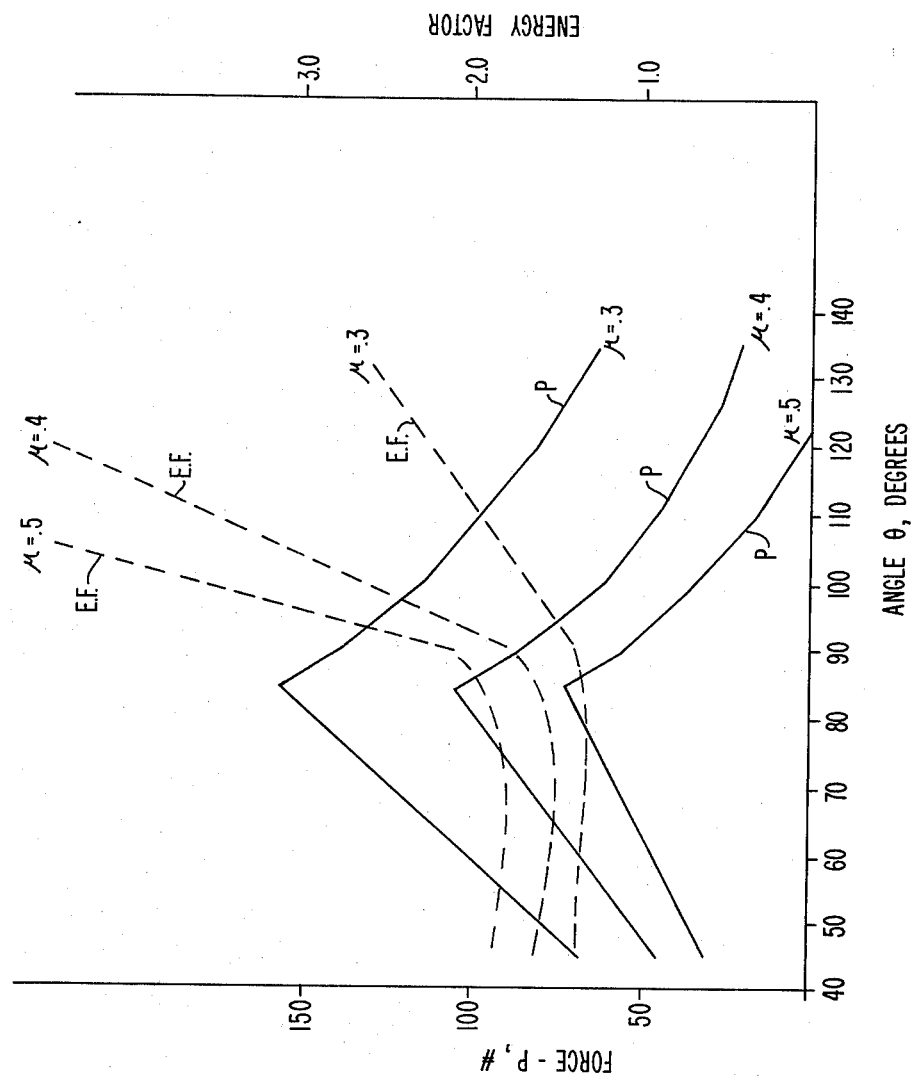
FIG. 10 is a graph which aids in the understanding of the relationship shown in FIG. 9.

FIG. 10 is a chart which plots the force P versus angle $\theta$, and the energy factor EF versus the angle $\theta$, for different values of the coefficient of friction $\mu$, assuming a brake drum having a diameter of 8", and a brake torque of 1000 in. #. Note that as the angle $\theta$ changes from 68° to 85°, and then moves back again to 68°, that the energy factor EF increases from the 68° value. Thus, any change in brake torque during seating-in, is an increase in brake torque, which is desirable.

For an up traveling escalator, the brake action is opposite to that described for a downwardly traveling escalator, and the braking action is partially deenergizing. In this instance, the brake force F tends to rotate the brake shoe 116 clockwise, which reduces the normal force. A brake having an energy factor of 1.5 in the downward direction, would only have an energy factor of 0.66 in the upward direction. Thus, if the brake torque is 1000 in. pounds in the downward travel direction, it would be reduced to only 440 in. pounds in the upward travel direction.

Thus, there has been disclosed a new and improved brake, which is especially suitable for escalators. The brake inherently brakes with a greater braking force when the escalator is traveling downwardly, than when it is traveling upwardly. Further, the brake shoes are initially applied to the brake drum with very little force, and the braking force is allowed to build according to a predetermined deceleration schedule, in order to maintain jerk at a very low level.

I claim as my invention:

1. A spring-applied, electrically released drum brake, comprising:
   a rotatable brake drum,
   first and second brake shoes pivotally operable between brake-applied and brake-released positions, relative to said brake drum, with the pivot points of said first and second brake shoes being disposed, relative to the rotational axis of said brake drum, to be self-energizing in one direction of rotation of the brake drum, and partially deenergizing in the other direction,
   means for operating said first and second brake shoes including an axially displaceable rod member, and means mechanically linking said rod member and said first and second brake shoes,
   first compression spring means on said rod member, said first compression spring means being pre-compressed to bias said rod member in a first axial direction which biases said first and second brake shoes towards the brake-applied position, with a first predetermined force,
   electromagnetic means arranged for selective energization and deenergization,
   second compression spring means on said rod member,
   said electromagnetic means being arranged to compress said second compression spring means when said electromagnetic means is energized, said electromagnetic means compressing said second compression spring means without axial movement of said rod member until the stored force in said second compression spring means exceeds the stored force in said pre-compressed first compression spring means, at which time said rod member is moved in a direction opposite to said first axial direction to operate said first and second brake shoes to the brake-released position,
   and control means for controlling the release of the stored force in said second compression spring means when the electromagnetic means is deenergized and said rod member moves in the first axial direction to operate said first and second brake shoes from the brake-released to the brake-applied position,
   said first and second compression spring means being arranged relative to said rod member such that movement of said rod member in the first axial direction causes the braking force applied to said brake drum by said first and second brake shoes to be responsive to the difference between the stored forces in said first and second compression spring means at any instant, to cause the braking force applied to said brake drum to start at a low value and increase to substantially the first predetermined force according to the rate at which said control means allows the second compression spring means to release its stored force.

2. The brake of claim 1 wherein the electromagnetic means is an electrical solenoid having an armature operable over a predetermined stroke, with the control means including means for controlling the position of the armature.

3. The brake of claim 2 wherein the control means is a dashpot.

4. The brake of claim 2 wherein the control means controls the position of the armature by controlling the current in the electrical solenoid.

5. The brake of claim 2 wherein the second compression spring means includes at least first and second springs wherein energy is stored in only the first spring during an initial part of the armature stroke, and energy is stored in both the first and second springs during the remainder of the stroke, to provide a compound spring force versus stroke position characteristic which follows the solenoid force versus stroke position characteristic without exceeding it.

6. The brake of claim 2 wherein the first compression spring means includes a single spring which is pre-biased to provide a first predetermined stored force when the first and second brake shoes are in the brake-applied position, and the second compression spring means includes at least first and second springs wherein energy is stored in only the first spring during an initial part of the armature stroke, and energy is stored in both the first and second springs during the remainder of the stroke, to provide a compound spring force versus stroke position characteristic which follows the solenoid force versus stroke position characteristic, at least until the first predetermined stored force of the first compression spring means is exceeded, without exceeding the solenoid force at any stroke position.

7. The brake of claim 1 wherein the rod includes first and second spring seats fixed to its opposite ends, a third spring seat encircling the rod which is externally fixed, and a fourth spring seat slidably disposed on the rod between the second and third spring seats, with the first compression spring means including a spring which extends between the first and third spring seats, the second compression spring means including a spring which extends between the second and fourth spring seats, and including means linking the electromagnetic means and said fourth spring seat.

8. The brake of claim 1 wherein the electromagnetic means is an electrical solenoid having an armature operable over a predetermined stroke, with the control means being a dashpot arranged to cushion the operation of the armature in both travel directions.

* * * * *